United States Patent [19]
Koukal et al.

[11] Patent Number: 5,139,458
[45] Date of Patent: Aug. 18, 1992

[54] FRESH-AIR SUPPLY SYSTEM FOR A VENTILATION DEVICE OF A VEHICLE

[75] Inventors: Heinz Koukal; Klaus Arold, both of Sindelfingen; Hans Trube, Herrenberg; Gernoth Karioth, Sindelfingen, all of Fed. Rep. of Germany

[73] Assignee: Mercedes-Benz AG, Fed. Rep. of Germany

[21] Appl. No.: 687,949

[22] Filed: Apr. 19, 1991

[30] Foreign Application Priority Data

Apr. 20, 1990 [DE] Fed. Rep. of Germany ....... 4012568

[51] Int. Cl.⁵ .............................................. B60H 1/28
[52] U.S. Cl. .................................................... 454/147
[58] Field of Search ............... 98/2.16, 2.17; 295/192, 295/208

[56] References Cited

FOREIGN PATENT DOCUMENTS

| | | | |
|---|---|---|---|
| 1680065 | 12/1973 | Fed. Rep. of Germany | 98/2.17 |
| 2242107 | 3/1974 | Fed. Rep. of Germany | . |
| 48302 | 2/1983 | Japan | 98/2.17 |
| 157871 | 7/1987 | Japan | 296/192 |

Primary Examiner—Harold Joyce
Attorney, Agent, or Firm—Evenson, Wands, Edwards, Lenahan & McKeown

[57] ABSTRACT

A fresh-air supply system for a vehicle ventilation device through an air inlet opening in a bonnet or hood swivellably attached to the vehicle bodywork, has a fresh-air duct which starts from the air inlet opening, the first duct portion of which is arranged underneath the air inlet opening on the bonnet and the second duct portion of which is arranged immovably on the bodywork. The two duct portions of the fresh-air duct are brought by the closing movement of the bonnet into a connection position in which a circumferential sealing flange of the first duct portion cooperates with a corresponding sealing flange of the second duct portion. The cooperating sealing flanges of the two duct portions, lying in an approximately horizontal plane, are covered over by the bonnet. The first duct portion is a water-collecting box surrounding the air inlet opening and having a drainage device. An overflow opening from the first duct portion to the second duct portion lies above the drainage level in the first duct portion, in a manner protected from direct ingress of water.

11 Claims, 2 Drawing Sheets

FRESH-AIR SUPPLY SYSTEM FOR A VENTILATION DEVICE OF A VEHICLE

BACKGROUND AND SUMMARY OF THE INVENTION

The present invention relates to a fresh-air supply system for a ventilation device of a vehicle and, more particularly, to a fresh-air supply system in which the devices belonging to the ventilation system which must be protected from water can nevertheless be arranged simply in an accessible region of the fresh air duct after the vehicle hood is opened.

A fresh-air supply system is shown in German Patent 2,242,107 where the fresh-air duct initially extends obliquely downwards and rearwards as far as an overflow opening in an end wall of the bodywork, at which the bonnet-side duct portion ends. In order to permit a leakproof connection of the first duct portion to the second duct portion lying on the other side of the end wall when the bonnet is closed, a sealing profile made of an elastomeric material is arranged between a sealing flange of the second duct portion. The flange surrounds the overflow opening and a sealing flange of the first duct portion. The flange cooperates with the first flange.

The known fresh-air supply system is already distinguished by the fact that all units or the like lying underneath the swivelled-up duct portion after the opening of the bonnet are freely accessible. However, the fact that devices which require an installation position which is protected from water cannot be fitted without further measures in that region of the fresh-air duct which is accessible after the opening of the bonnet must be seen as disadvantageous. Such devices are, for example, a fan motor, a dust filter or an aggregation of these elements.

An object of the present invention is the provision of a fresh-air supply system for a vehicle ventilation device such that devices belonging to the ventilation system which require an installation position protected from water can be arranged without problems in that region of the fresh-air duct which is accessible after the opening of the bonnet.

This object has been achieved in accordance with the present invention by cooperating sealing flanges of two duct portions, lying in an approximately horizontal plane, and covered over by the engine hood. The first duct portion is a water-collecting box surrounding the air inlet opening and has a water drain. An overflow opening from the first duct portion to the second duct portion lies above the drainage level in the first duct portion to protect from direct ingress of water. It thereby is possible to prevent water from crossing from the first into the second duct portion with sufficient certainty. The arrangement of devices belonging to the ventilation system near to the sealing flange in the second duct portion in a manner protected from water is thus possible. The present invention thus makes it possible to guarantee easy access to the devices due to the fact that the sealing flange extends in an approximately horizontal plane.

In order to permit as flat a construction of the first duct portion as possible in combination with sufficient vertical overlap, the overflow opening can be arranged in the upper region of a connection piece which projects upward through the cross-section of passage of the upper sealing flange.

It is nevertheless advantageous if the sealing flange of the first duct portion likewise lies higher than the drainage level of this duct portion determined by the arrangement of the drainage device. As a result, the sealing flange is not subjected to the pressure of any temporary accumulation of water in the lowest region of the duct portion.

In order to be able to keep the cross-sectional extension of the first duct portion as small as possible, provision is made for the overflow opening to be partially overlapped by the air inlet opening. To ensure that no water can drip directly down into the overflow opening through the air inlet opening in this overlap region, a deflector profile configured as a collecting channel is provided. The channel is surrounded on three sides by raised walls and, on the fourth side, has a downward-angled overflow rim. In this embodiment, most of the water caught by the deflector profile can be guided off separately via a drainage connection of the deflector profile while the remainder runs off via the overflow rim into the lowest region of the first duct portion. Given a sufficient occurrence of water, the risk of accumulation in the first duct portion can be considerably increased thereby.

To prevent the accumulated water in the first duct portion from washing around the sealing flange of the latter, a baffle wall can be arranged in the sealing flange.

Due to the possibility of a compact configuration of the first duct portion due to a water-collecting box of narrow cross-section, the fresh-air supply system is especially suitable for a narrow and, at the same time, elongate air inlet opening.

So that a large-sized dust filter can be arranged in the cross-flow of the second duct portion despite the narrow cross-section of the first duct portion over the majority of its length, a widening of the first duct portion in an end region of the latter is provided, as a result of which the portion has an approximately L-shaped basic cross-section overall.

To make possible a low resistance deflection of the flow of the air as it passes into the connection piece, the overflow opening can be arranged transversely to the incident-flow direction of the air. Because the incident air is guided approximately horizontally below the deflector profile, the overflow opening must accordingly flow laterally into the connection piece. As a result, the overflow cross-section is considerably smaller than the cross-section of passage of the sealing flange. Accessibility of the second duct portion is maintained in the full cross-section of passage by providing the connection piece with a collar which cooperates like a cover with an opposite supporting flange and is connected in easily releasable fashion to the latter. The collar and the supporting flange thus together form the sealing flange of the second duct portion.

BRIEF DESCRIPTION OF THE DRAWINGS

These and other objects, features and advantages of the present invention will become more apparent from the following detailed description of a presently preferred embodiment when taken in conjunction with the accompanying drawings, wherein.

DETAILED DESCRIPTION OF THE DRAWINGS

Figure 1:
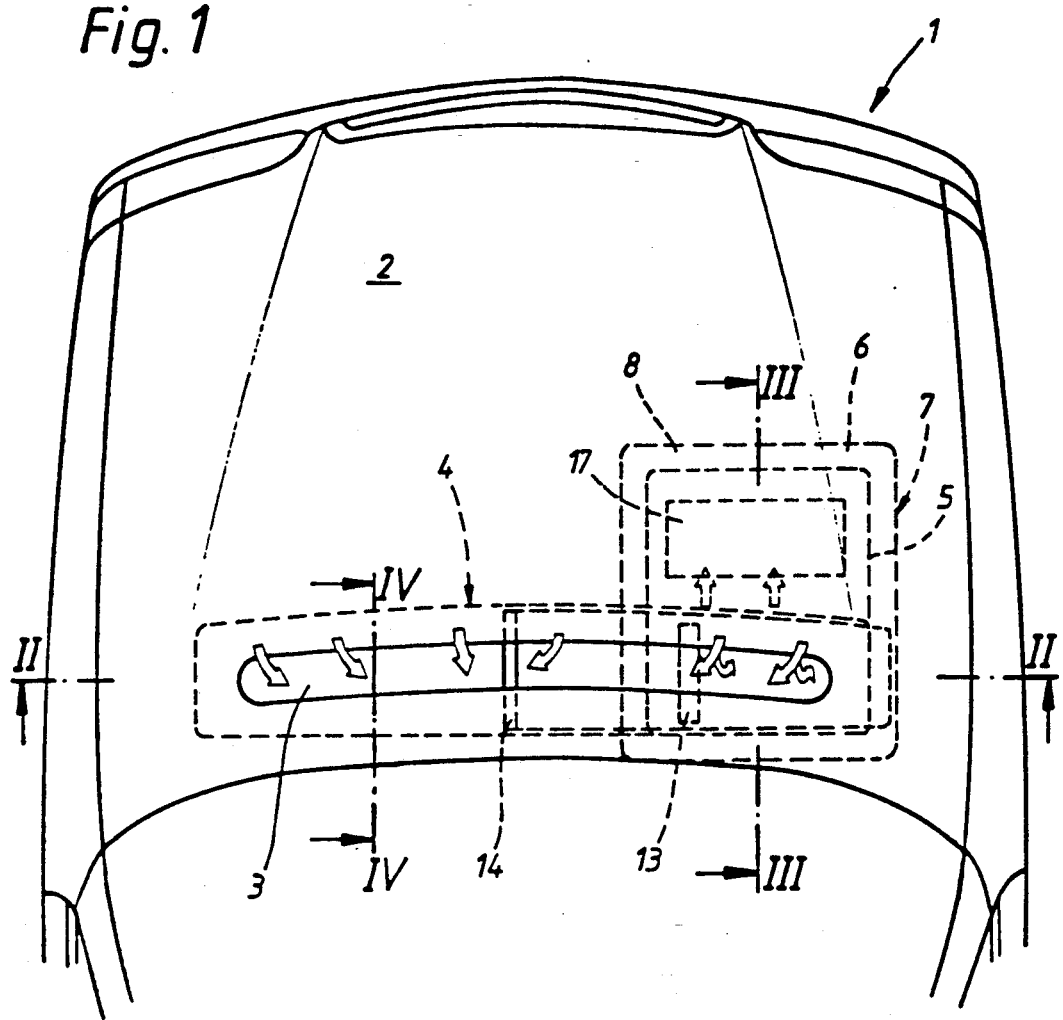
FIG. 1 is a plan view of a bonnet of a motor vehicle, with the bonnet or hood covering a fresh-air duct.

In the plan view according to FIG. 1, the front region of a motor vehicle 1 can be seen, in which is situated in customary fashion an engine compartment covered over towards the top by a closed bonnet or hood 2. The hood 2 is attached swivellably to the bodywork in the rear region, with the swivelling axis extending horizontally in the transverse direction of the motor vehicle 1. Accordingly, when the bonnet 2 is unlocked it can be swivelled up rearwardly, after which the engine compartment is accessible from above in the customary manner.

An air inlet opening 3 penetrates the hood 2 near to a rear edge thereof, through which opening fresh air for a ventilation or heating device of the motor vehicle 1 is drawn in from outside. The air inlet opening 3, which is situated in that surface of the bonnet 2 over which air flows, consists of a relatively wide slot which extends generally parallel and transverse to the rear edge of the bonnet 2, but slightly arched, and ends on both sides at a lateral distance from the lateral edge of the bonnet 2.

A fresh-air duct, which is sealed off hermetically from the engine compartment, is provided underneath the bonnet 2 in order to guide the air which has flowed through the air inlet opening 3. This fresh-air duct comprises, as seen in FIG. 2, a first duct portion 4, which is firmly connected to the bonnet 2, and a second duct portion 5, which is firmly connected in a conventional manner (not shown), to a front wall of the bodywork so as to be held immovable.

In order to establish a positive leakproof connection of the first duct portion 4 to the second duct portion 5 when the bonnet 2 is closed, the first duct portion 4 ends in a circumferential sealing flange 6, which is lowered in the course of the closing movement of the bonnet or hood 2 onto a congruent sealing flange 7, which is arranged in the region of the start of the second duct portion 5, in an approximately horizontal plane. In a final phase of the shortening of the distance between the mutually opposite faces of the sealing flanges 6, 7, a circumferential elastomeric seal 8 which is secured on the underside of the sealing flange 6 is sized and configured so as to be compressed. Since the sealing flange 7 is covered over by the bonnet 2 itself, the second duct portion 5 thus becomes accessible from above when the bonnet 2 is opened.

To ensure that the flow of fresh air is enclosed on all sides from the air inlet opening 3 to the sealing flange 6, the duct portion 4 comprises a cowl, which is closed at the periphery as seen in a plan view and is of L-shaped configuration overall. The longer leg of duct portion 4 here lies below the air inlet opening 3 and, in the right-hand end region of the air inlet opening 3, merges into a short leg which is angled forwards and is formed by a rectangular widened portion of the longer leg. The cross-section in the widened end region of the longer leg is here matched overall to the clear exit cross-section of the rectangular sealing flange 6, this exit cross-section thereby in part lying perpendicularly below the right-hand end region of the air inlet opening 3.

Figure 2:
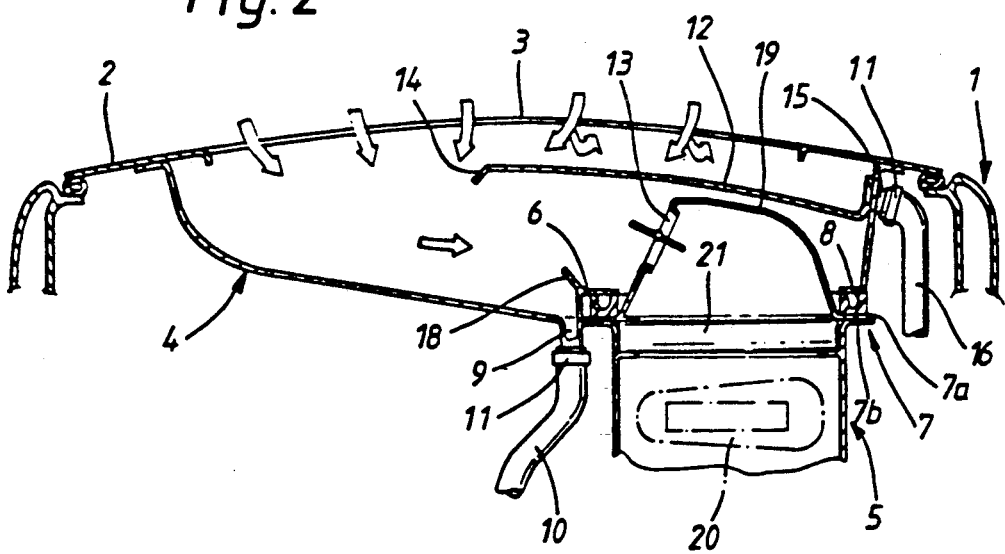
FIG. 2 is a vertical sectional view through the fresh-air duct along line II—II in FIG. 1.
Figure 4:
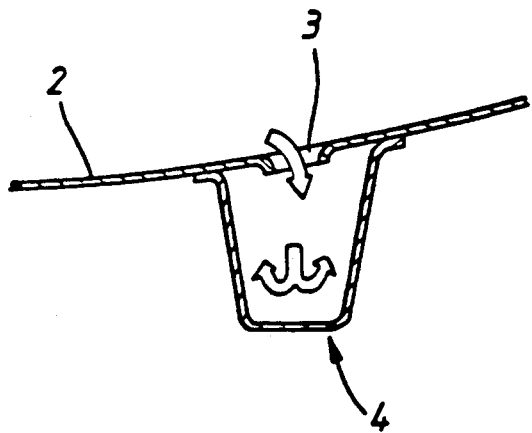
FIG. 4 is a vertical sectional view along line IV—IV in FIG. 1.

As can be seen in FIG. 2 taken in conjunction with FIG. 4, the longer leg of duct portion 4 extends as a water-collecting box from the sealing flange 6 to behind the left-hand end of the air inlet opening 3 and has an approximately trapezoidal clear cross-section. The walls of this water box surround the longitudinal portion of the air inlet opening 3 situated above it while maintaining a spacing and are secured water-tightly to the underside of the bonnet 2 by an upper rim or flange. Whereas this water box of duct portion 4 is essentially constant in cross-sectional width, as seen over its length, so as to correspond to a multiple of the width of the air inlet opening 3, the cross-sectional height increases continuously towards the sealing flange 6. Due to the resulting gradient, the water box has the greatest depth directly adjacent to the sealing flange 6, the bottom of the water box lying clearly lower at this point than the sealing flange 6 itself.

To ensure that water which has entered the water box of duct portion 4 through the air inlet opening 3 can be removed completely, a drainage connection 9, is formed at the lowest point of the water box via which the water can flow off again. A drainage hose 10, secured by a conventional clip 11, is pushed onto the drainage connection 9. The drainage hose 10 is laid or coursed in such a way that water flowing through it is guided off to the outside outside the engine compartment in a known manner.

Arranged above the sealing flange 6 and close underneath the air inlet opening 3 is a deflector profile 12, by which an overflow opening 13 lying below the profile 12 and leading to the second duct portion 5 is protected from water falling directly through the air inlet opening 3. The plate-shaped deflector profile 12 is matched to the clear width of the longer leg of the duct portion 4 and extends continuously from a right-hand side wall of duct portion 4 approximately as far as the longitudinal center of the air inlet opening 3, thereby ending only at a lateral distance from the sealing flange 6. The surface plane of the deflector profile 12 extends approximately parallel to the bonnet 2, which is slightly arched in the transverse direction, with the result that it has a slope in relation to the side wall of duct portion 4. Walls which have been bent upwards and connected to one another in leakproof fashion are formed on the deflector profile 12 along a front, rear and right-hand edge, the deflector profile 12 thereby being constructed as a collecting channel having the form of a box on three sides. A fourth wall of the deflector profile 12, running along the left-hand edge, is not raised but bent downwards obliquely to the left, with the result that an overflow rim 14 is formed over which the water can run into the water box of duct portion 4.

In order that not all the water caught by the deflector profile 12 passes over the overflow rim 14 into the lower part of duct portion 4, a further drainage connection 15 is formed on the opposite wall of the deflector profile 12, which wall is attached to the right-hand side wall of the duct portion 4. The drainage connection 15 passes through the right-hand side wall of duct portion 4. The clear cross-section of the drainage connection 15 lies directly above the bottom surface of the deflector profile 12, so that complete emptying of the profile 12 is possible. A drainage hose 16, via which water can be guided off to the outside, is pushed onto drainage connection 15, outside duct portion 4. When laying the drainage hose 16 and also the drainage hose 10, an excess length must furthermore be allowed for to ensure that the opening movement of the bonnet 2 remains possible despite the hose connections.

Figure 3:
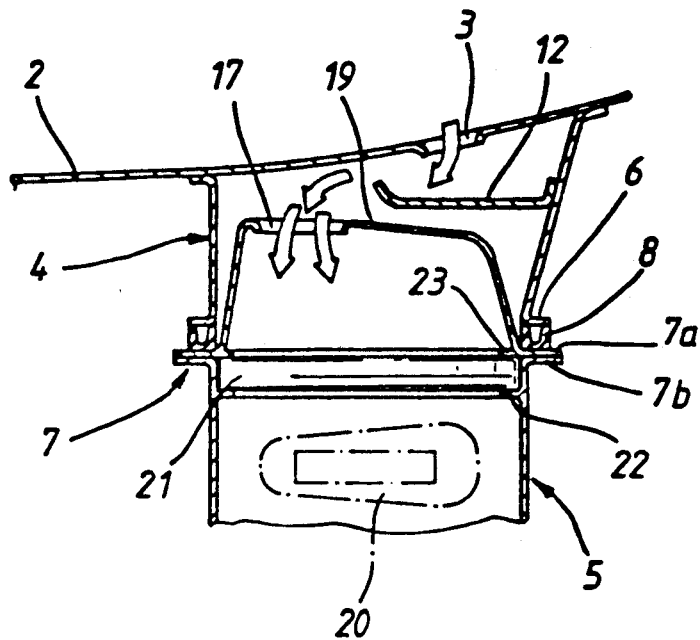
FIG. 3 is a vertical sectional view through the fresh-air duct along line III—III in FIG. 1.

As indicated by broad arrows, due to this arrangement of the deflector profile 12 the air entering in the right-hand half of the air inlet opening 3 cannot reach the overflow opening 13 directly; rather, the downward-directed flow must be deflected horizontally to enable it to pass the deflector profile 12. During this flow, as can be seen in FIG. 3, a portion of this volumetric flow can be deflected forwardly, and it can flow between the front wall of the deflector profile 12 and the underside of the bonnet 2, which extends at a vertical spacing with respect to the profile, to a horizontal overflow opening 17 of the second duct portion 5, which overflow opening 17 lies close underneath the deflector profile 12.

Thus, the second overflow opening 17 also lies clearly above the drainage level of duct portion 4, and is covered over by a region of the bonnet 2 in which the surface is unbroken and thereby being arranged in a manner protected from direct ingress of water.

Since the deflector profile 12 rests by its rear longitudinal side against the rear wall of the duct portion 4, the remaining part of the volume flow of air deflected by the deflector profile 12 can only flow off to the center of the width of the bonnet 2 until it has reached the overflow rim 14 of the deflector profile 12. After passing over the overflow rim 14, it can then flow in the opposite direction below the deflector profile 12 towards the overflow opening 13, which lies in a steeply inclined plane between the deflector profile 12 and the sealing flange 6. Due to its position, the overflow opening 13 lies only slightly higher than the sealing flange 6. To ensure nevertheless that water which has accumulated in front of the drainage connection 9 in the duct portion 4 cannot pass into the overflow opening 13, a baffle wall 18 is integrally formed on the sealing flange 6 and extends obliquely upwards to the left as seen in cross-section (FIG. 2) towards the overflow rim 14.

Both overflow openings 13 and 17 are cut out of a connection piece 19 which protrudes upwards into the interior of duct portion 4 through the cross-section of passage of the sealing flange 6. This connection piece 19, which is formed in a hat-shape, is provided at its lower end with a circumferential collar 7a, which rests like a cover on an opposite and thus likewise circumferential supporting flange 7b and is connected to the latter by, for example, spring clips or other conventional, easily releasable fasteners.

Since the supporting flange 7b is firmly connected to duct portion 5 and the collar 7a is connected to the supporting flange 7b with a leakproof connection, the seal 8 is supported on the upward-turned side of the collar 7a, with the supporting flange 7b and the collar 7a thereby forming the sealing flange 7 together.

A fan 20 is arranged somewhat below the sealing flange 7 in the cross-section of the second duct portion 5 through which flow occurs, to transport the conveyed air through the longitudinal region (no longer visible) of the duct portion into the interior of the motor vehicle 1. As a result, that longitudinal region of the duct portion 5 which lies upstream of the fan 20 forms a fan intake space together with the hollow volume of the connection piece 19. A dust filter 21 is fitted in this fan intake space transversely to the direction of flow of the air and is configured as a cross-flow filter to serve in a known manner to separate out particles, pollen or the like from the fresh air. The circumference of the dust filter 21 is matched to the internal circumference of the duct portion 5, as a result of which no air can pass the dust filter 21 unfiltered. To ensure that the dust filter 21 is fixed in its installation position, it rests circumferentially on a supporting rim 22 which projects all the way around from the internal circumference of duct portion 5. On its upper side, the filter 21 is held down by an oppositely situated annular web 23 which projects from the internal circumference of the connection piece 19. With the connection piece 19 removed, the dust filter 21 can simply be lifted up and removed, making possible particularly rapid exchange of the dust filter 21 during servicing. In addition, the simple removal of the dust filter 21 makes the fan 20 situated below it accessible without problems.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A fresh-air supply system for a vehicle ventilation device through an air inlet opening in a bonnet swivellably attached to vehicle bodywork, comprising a fresh-air duct which starts from the air inlet opening and having first duct portion arranged underneath the air inlet opening on the bonnet and a second duct portion arranged immovably on the bodywork, the two duct portions of the fresh-air duct being brought by the closing movement of the bonnet into a connection position in which a circumferential sealing flange of the first duct portion cooperates with a corresponding sealing flange of the second duct portion, wherein the cooperating sealing flanges of the two duct portions, lying in an approximately horizontal plane, are covered over by the bonnet, the first duct portion being a water-collecting box surrounding the air inlet opening and having a drain, and an overflow opening from the first duct portion to the second duct portion lies above a drainage level in the first duct portion, so as to be protected from direct water ingress.

2. The fresh-air supply system according to claim 1, wherein a connection piece provided with the overflow opening projects from the second duct portion and protrudes into the interior of the first duct portion through a passage cross-section of one of the sealing flanges.

3. The fresh-air supply system according to claim 1, wherein the sealing flange of the first duct portion is arranged on the first duct portion in a position offset upwards relative to the drainage level.

4. The fresh-air supply system according to claim 3, wherein a connection piece provided with the overflow opening projects from the second duct portion and protrudes into the interior of the first duct portion through a passage cross-section of one of the sealing flanges.

5. The fresh-air supply system according to claim 1, wherein the overflow opening is partially overlapped by the air inlet opening and, in the region of the overlap, the one overflow opening is shielded against direct water ingress by a deflector profile.

6. The fresh-air supply system according to claim 5, wherein the deflector profile is a box-shaped collecting channel with an outlet on a side secured to a duct wall and an overflow rim on the opposite side.

7. The fresh-air supply system according to claim 6, wherein a baffle wall is arranged on the overflow side of the deflector profile and extends obliquely upwards from the sealing flange of the first duct portion to the overflow rim.

8. The fresh-air supply system according to claim 1, wherein the bonnet has a single slot constituting the air inlet opening which extends transversely near to a rear edge of the bonnet.

9. The fresh-air supply system according to claim 8, wherein the duct portion arranged on the bonnet has an approximately L-shaped cross-section, with one of the legs of the cross-section being determined by a rectangular configuration of the sealing flanges.

10. The fresh-air supply system according to claim 2, wherein the connection piece has a circumferential collar held on an opposite supporting flange of the second duct portion, so as to rest on the second duct portion, with the collar and the supporting flange thereby together belonging to the sealing flange of the second duct portion.

11. The fresh-air supply system according to claim 1, wherein a fan and a dust filter are arranged in a longitudinal region of the duct portion situated near to one of the sealing flanges.

* * * * *